United States Patent
Synal

(10) Patent No.: US 11,765,582 B2
(45) Date of Patent: Sep. 19, 2023

(54) ASYMMETRIC KEY EXCHANGE BETWEEN USER EQUIPMENT USING SIP

(71) Applicant: T-Mobile USA, Inc., Bellevue, WA (US)

(72) Inventor: Adrian T. Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 246 days.

(21) Appl. No.: 16/947,857

(22) Filed: Aug. 20, 2020

(65) Prior Publication Data

US 2022/0060891 A1   Feb. 24, 2022

(51) Int. Cl.
| H04L 29/00 | (2006.01) |
| H04W 12/0431 | (2021.01) |
| H04W 8/24 | (2009.01) |
| H04W 12/037 | (2021.01) |
| H04W 12/0471 | (2021.01) |
| H04L 65/1104 | (2022.01) |
| H04L 67/55 | (2022.01) |

(52) U.S. Cl.
CPC ..... *H04W 12/0431* (2021.01); *H04L 65/1104* (2022.05); *H04L 67/55* (2022.05); *H04W 8/24* (2013.01); *H04W 12/037* (2021.01); *H04W 12/0471* (2021.01)

(58) Field of Classification Search
CPC ........... H04W 12/0431; H04W 12/037; H04W 12/0471; H04W 8/24; H04L 65/1104; H04L 67/55
USPC .......................................................... 726/26
See application file for complete search history.

(56) References Cited

U.S. PATENT DOCUMENTS

| 10,517,011 B2* | 12/2019 | Mondal ............. H04W 28/0236 |
| 2011/0103589 A1* | 5/2011 | Tie .......................... H04L 9/083 |
| | | 380/282 |
| 2011/0131414 A1* | 6/2011 | Cheng ..................... H04L 63/06 |
| | | 380/279 |

OTHER PUBLICATIONS

Marlinspike et al., "The X3DH Key Agreement Protocol," Revision 1, Nov. 4, 2016, 11 pages.
Open Mobile Alliance, "Presence SIMPLE Architecture," Approved Version 2.0, Jul. 10, 2012, Copyright 2012 Open Mobile Alliance Ltd., 30 pages.
Open Mobile Alliance, "Presence SIMPLE Data Specification," Approved Version 2.3, Dec. 22, 2015, Copyright 2015 Open Mobile Alliance Ltd., 62 pages.
Rosenberg et al., "SIP: Session Initiation Protocol," Network Working Group, Request for Comments: 3261, Jun. 2002, 269 pages.

(Continued)

*Primary Examiner* — Jeffrey C Pwu
*Assistant Examiner* — Michael D Anderson
(74) *Attorney, Agent, or Firm* — Lee & Hayes, P.C.

(57) ABSTRACT

A carrier network may provide for asymmetric key exchange for end to end encryption between user equipment utilizing capability upload and discovery messages of the carrier network. For example, a carrier network may receive a capability upload message from a first user equipment. The carrier network may determine that the capability upload message includes a key bundle for end to end (E2E) encryption of communications. In response, the carrier network may store the key bundle in a key distribution center (KDC). The carrier network may also receive, from a second user equipment, a capability discovery message requesting capability information for the first user equipment. In response, the carrier network may request and receive the key bundle from the KDC and transmit the key bundle to the second user equipment.

17 Claims, 4 Drawing Sheets

(56) References Cited

OTHER PUBLICATIONS

Roach, "Session Initiation Protocol (SIP)—Specific Event Notification," Network Working Group, Request for Comments: 3265, Jun. 2002, 38 pages.

Sugano et al., "Presence Information Data Format," Network Working Group, Request for Comments: 3863, Aug. 2004, 28 pages.

Niemi, "Session Initiation Protocol (SIP) Extension for event State Publication," Network Working Group, Request for Comments: 3903, Oct. 2004, 32 pages.

Schulzrinne et al., "RPID: Rich Presence Extensions to the Presence Information Data Format (PIDF)," Network Working Group, Request for Comments: 4480, Jul. 2006, 37 pages.

Camarillo et al., "Subscriptions to Request-Contained Resource Lists in the Session Initiation Protocol (SIP)," Network Working Group, Request for Comments: 5367, Oct. 2008, 9 pages.

Peterson et al., "Change Process for the Session Initiation Protocol (SIP) and the Real-time Applications and Infrastructure Area," Network Working Group, Request for Comments: 5727, Mar. 2010, 14 pages.

Niemi et al., "Session Initiation Protocol (SIP) Event Notification Extension for Notification Rate Control," Network Working Group, Request for Comments: 6446, ISSN: 2070-1721, Jan. 2012, 25 pages.

Rosenberg et al., "Indicating User Agent Capabilities in the Session Initiation Protocol (SIP)," Network Working Group, Request for Comments: 3840, Aug. 2004, 36 pages.

GSM Association, "Rich Communication Suite—Advanced Communications Services and Client Specification Version 11.0," Oct. 2019, Official Document RCC.07—Rich Communication Suite Advanced Communications Services and Client Specification, 389 pages.

* cited by examiner

ASYMMETRIC KEY EXCHANGE BETWEEN USER EQUIPMENT USING SIP

BACKGROUND

Modern cellular communication networks often include IP Multimedia Subsystems (IMSs) for delivering services such as messaging. In many situations, users who are attempting to message with each other may desire privacy.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations include devices, systems, and methods that provide an asymmetric key exchange for end to end encryption in services of a carrier network, such as Rich Communication Services (RCS). In certain described embodiments, the devices, systems, and methods disclosed herein relate to performing a key exchange using capability upload and capability discovery messages of a carrier network.

In some examples, the capability upload and capability discovery messages of a carrier network may be SIP messages. Using RCS as an example, a first RCS client may generate keys for a key bundle. The first RCS client may then use a capability upload message (e.g., a SIP INFO or PUBLISH message) to upload the key bundle to the carrier network. In turn, the carrier network may store the bundle in a Key Distribution Center (KDC). A second RCS client desiring to communicate with the first RCS client may then use a capability discovery message (e.g., a SIP OPTIONS or SIP SUBSCRIBE message) to obtain the key bundle from the carrier network and KDC. The retrieved key bundle may then be used to communicate in RCS with end to end encryption between the clients.

In such examples, the use of the SIP capability upload and SIP capability discovery messages of a carrier network to upload and retrieve key bundles may allow current SIP enabled devices to reuse SIP methods for capability exchange in SIP Application Servers and OMA Presence servers without having to develop new protocols.

While SIP capability upload and SIP capability discovery messages and the operations of SIP enabled devices may be utilized in the discussions of example embodiments throughout this disclosure, this disclosure and the appended claims are not so limited. For example, other embodiments may utilize other capability upload and discovery protocols and procedures of carrier networks to accomplish similar functions.

Figure 1:
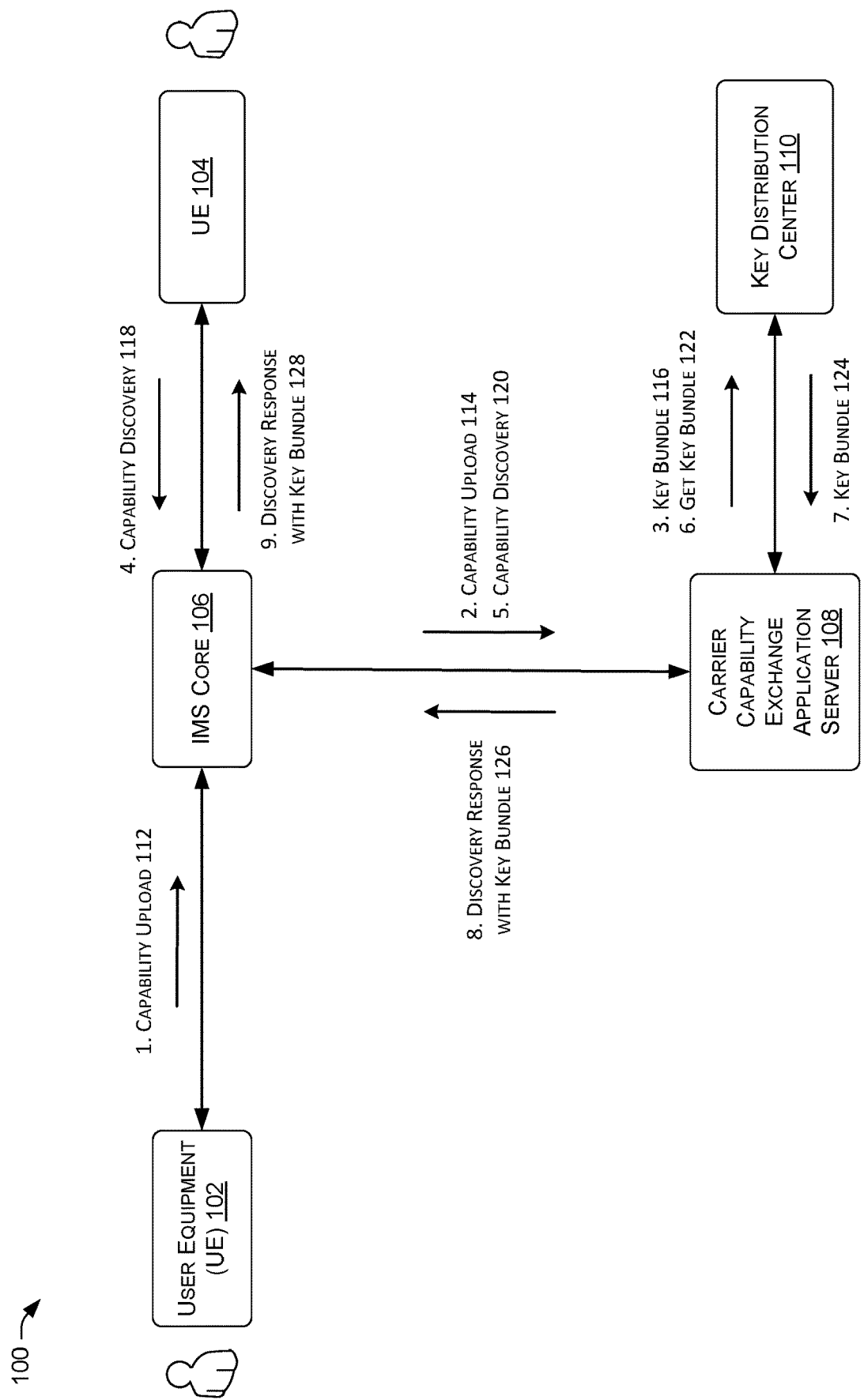
FIG. 1 is a block diagram illustrating a communication system that may provide asymmetric key exchange for end to end encryption between user equipment utilizing capability upload and discovery messages in a carrier network.

FIG. 1 illustrates an example telecommunication system 100, which may provide asymmetric key exchange for end to end encryption between user equipment utilizing capability upload and discovery messages in a carrier network. The system 100 includes user equipment (UE) 102, UE 104, an IMS core 106 of a carrier network, a carrier capability exchange application server 108 of a carrier network, and a key distribution center (KDC) 110.

The IMS core 106 may be a control layer of an IMS architecture that may be responsible for regulating communications flows. Such an IMS core may include a Call Session Control Function (CSCF), a Home Subscriber Server (HSS), a Signaling Gateway (SGW) and Media Gateway Control Function (MGCF), and/or a Media Resource Functions (MRF). In some examples, the CSCF may be responsible for controlling sessions between end-points (referred to as terminals in the IMS specifications) and applications. The HSS may be a database that maintains user profile information used to authenticate and authorize subscribers. The SGW and MGCF may provide interoperability with the public switched telephone network (PSTN). Further, the MRF may provide media-related functions such as the playing of tones and digital announcements.

The IMS core 106 may provide communication services to user equipment of one or more carriers. Communications may be between UEs of the same carrier (also referred to herein as service provider) and/or may be between UEs supported by different carriers. For example, the illustrated UE 102 may be a subscriber of the home carrier associated with the carrier network while UE 104 may be a subscriber of the same or a different carrier network.

The IMS core 106 may support various types of communication and media services. In some examples, the IMS core 106 may include a telephony access server that provides voice communication services. The IMS may also include or support other functions such as an IP short message gateway (IP-SM-GW), which is a service for communicating short messages, such as short message service (SMS) over IP (SMSIP) messages, between UEs. The IMS core 106 may also include or support the Rich Communication Suite (RCS), which may be a platform that supports various types of media communications, including one-to-one chat, group chat, file transfer, content sharing, voice calling, video calling, social presence, video calling, geolocation exchange, service identification, notifications, and others. Each of these services may be implemented by one or more corresponding application servers that form part of the IMS application layer.

The carrier capability exchange application server 108 of the carrier network may operate to provide services to the UE (e.g., services used in communications between UEs) as part of an application layer of the IMS architecture. The carrier capability exchange application server 108 may be responsible for the execution of service-specific logic, for example call flows and user interface interactions with subscribers.

The UEs 102 and 104 may each comprise a communication device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. The UEs 102 and 104 may also comprise a non-mobile computing device. Examples of non-mobile UEs may include such things as televisions, desktop computers, a game consoles, set top boxes, home automation components, security system components, and so forth. In this sense, the terms "communication device," "wireless device," "wireline device," "mobile device," "computing device," and "user equipment (UE)" may be used interchangeably herein to describe any communication device capable of performing the techniques described herein.

Furthermore, the UEs 102 and 104, as well as the various network provider components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology. These are merely examples and the UEs 102 and 104, as well as the various network provider components described herein, may be capable of communicating via one or more of a 3G, 4G, 4G LTE, and/or 5G protocols.

The UEs 102 and 104 may communicate with the IMS core 106 using an access network (not shown), which may comprise a cellular communication network or other type of wired or wireless network. Examples of wireless access networks include LTE, WIFI, GSM EDGE Radio Access Network (GERAN), UMTS Terrestrial Radio Access Network (UTRAN), and other cellular access networks.

The UEs 102 and 104 may be configured to initiate a communication session, such as a voice call, a video call, or another sort of synchronous or asynchronous communication. Initiation of such communications may involve communication clients and session initiation protocol (SIP).

In the operations illustrated in FIG. 1, the UE 102, UE 104, IMS core 106, carrier capability exchange application server 108, and KDC 110 may operate to provide asymmetric key exchange for end to end encryption between UEs 102 and 104 utilizing capability upload and discovery messages of the carrier network.

More particularly, the UE 102 may generate keys for end to end encryption and then package the keys into a key bundle. In some examples, the key bundle may include one or more long term identity public key pairs, one or more medium-term signed pre-key pairs, and one or more ephemeral prekey pairs. These keys may be shared with other UEs for use in end to end encryption, for example, in communication services such as RCS.

The UE 102 may then send a capability upload message 112 to the IMS core 106 that includes the key bundle. The IMS core 106 may then send the capability upload message 114 to the carrier capability exchange application server 108. In some examples, the carrier capability exchange application server 108 may be a carrier capability exchange application server associated with the communication service for which the key bundle is to be used to provide end to end encryption. However, examples are not so limited and other examples may include an application server dedicated to providing key exchanges.

The carrier capability exchange application server 108 may receive the capability upload message 114, extract the key bundle and an identifier for the UE 102 (or a user associated therewith) and send, to the KDC 110, a request to store the key bundle 116 in association with the identifier of the UE 102. The capability upload message 112, 114 is not limited to the key bundle. For example, while not shown, other capabilities may also be included in the capability upload message 114 in some examples. In such examples, the other capabilities may also be stored for the UE 102 by the carrier capability exchange application server 108.

The operations illustrated in FIG. 1 may then skip to when the UE 104 may wish to communicate with the UE 102 and may wish to discover the capabilities of the UE 102 and/or the key bundle for end to end encryption specifically.

In particular, the UE 104 may send a capability discovery message 118 to the IMS core 106. The capability discovery message 118 may include an identifier for the UE 102 and/or other information for the discovery procedure of the carrier network or service. The IMS core 106 may then send the capability discovery message 120 to the carrier capability exchange application server 108.

The carrier capability exchange application server 108 may extract the identifier of the UE 102 from the capability discovery message 120 and retrieve capability information for UE 102. The retrieval of capability information for UE 102 may include at least sending a get key bundle message 122 to the KDC 110 requesting a key bundle for the identifier of the UE 102. As alluded to above, the retrieval of capability information may include other messages to retrieve other capability information, an example of which is discussed with regard to FIG. 3. If the KDC 110 is storing a key bundle for the UE 102 (e.g., as shown in FIG. 1), the KDC 110 may send a message to the carrier capability exchange application server 108 including the key bundle 124. The carrier capability exchange application server 108 may gather the retrieved capability information and send a discovery response including the key bundle 126 to the IMS core 106. In turn, the IMS core 106 may forward the discovery response including the key bundle 128 to the UE 104.

The UE 104 may receive the discovery response including the key bundle 128 and extract the key bundle and other capability information. The UE 104 may then initiate communication with the UE 102 using the key bundle to facilitate end to end encryption.

Figure 2:
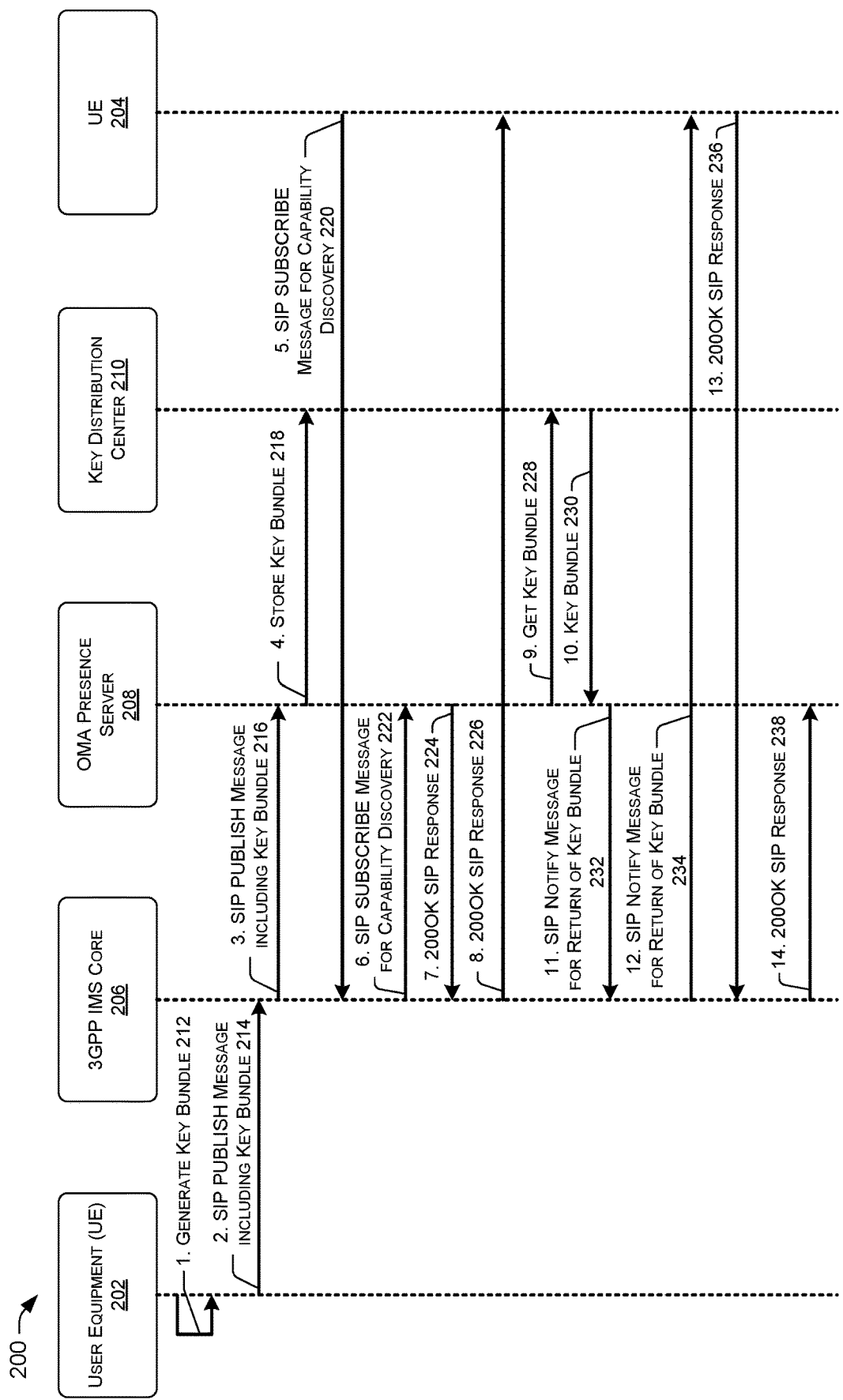
FIG. 2 is a flow diagram illustrating an example method of providing asymmetric key exchange for end to end encryption between user equipment utilizing capability upload and discovery messages in a carrier network in an example carrier network including an Open Mobile Alliance (OMA) presence server.
Figure 3:
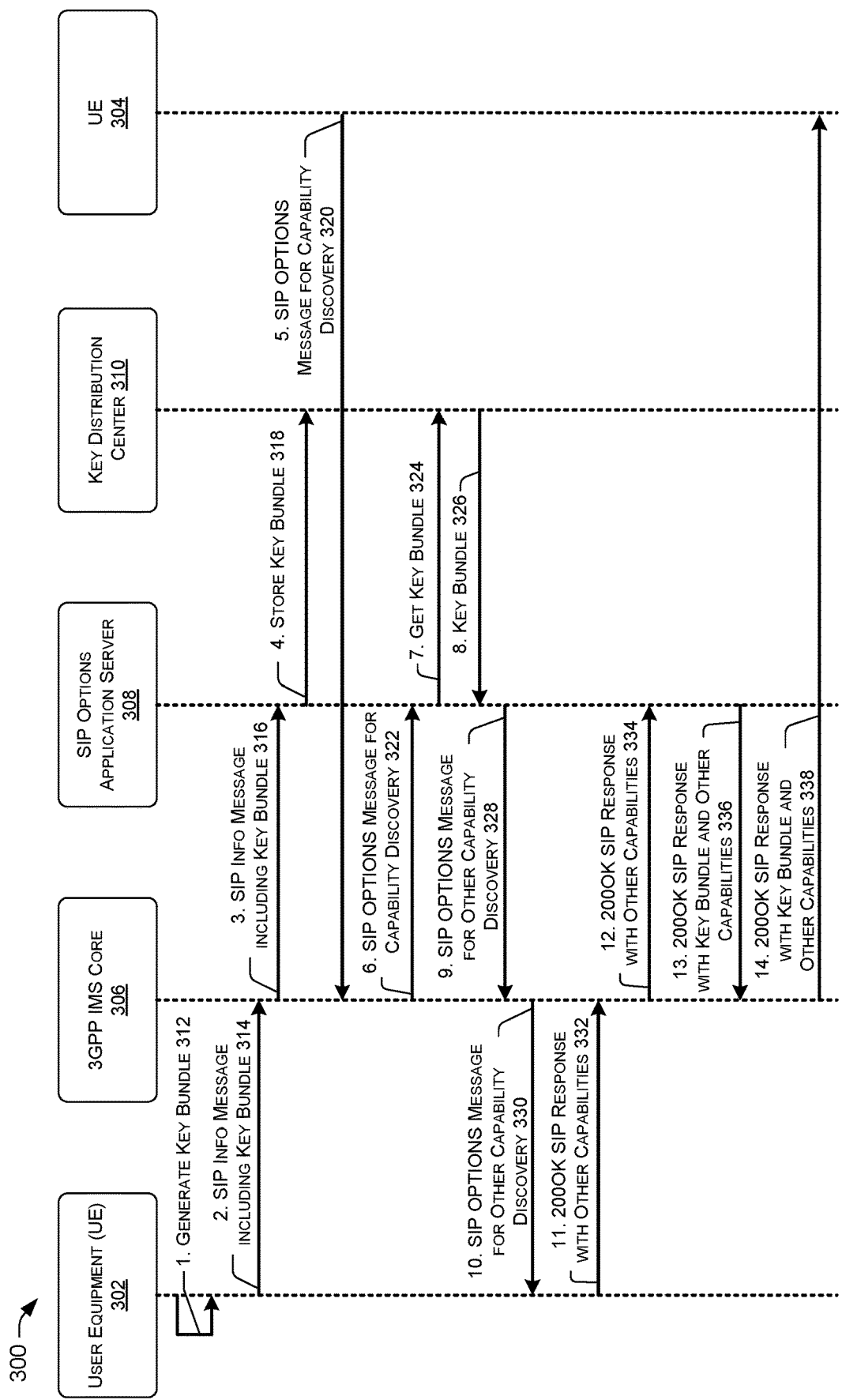
FIG. 3 is a flow diagram illustrating an example method of providing asymmetric key exchange for end to end encryption between user equipment utilizing capability upload and discovery messages in a carrier network in an example carrier network including a SIP OPTIONS application server.

While FIG. 1 illustrates an example system and communications flow for providing asymmetric key exchange for end to end encryption between user equipment utilizing capability upload and discovery messages in a carrier network, FIG. 1 includes simplified and generalized example and implementations are not limited to the specifics of FIG. 1. Rather, details may vary from implementation to implementation. FIGS. 2 and 3 may illustrate particular example communication flows in example implementations.

FIG. 2 illustrates an example communication flow 200 for providing asymmetric key exchange for end to end encryption between user equipment utilizing capability upload and discovery messages in a carrier network, according to some implementations. In the illustrated example, the system includes user equipment (UE) 202, UE 204, a 3GPP IMS core 206 of a carrier network, an OMA presence server 208 of the carrier network, and a key distribution center (KDC) 210. In the illustrated example, the data flow relates to an implementation of the disclosed systems and methods in a carrier network utilizing an OMA presence server. More particularly, the illustrated example of FIG. 2 may utilize the SIP PUBLISH message as a capability upload message and the SIP SUBSCRIBE message as a capability discovery message.

In the operations illustrated in FIG. 2, the UE 202 may generate keys for end to end encryption and then package the keys into a key bundle 212. As discussed above, the key bundle may include one or more long term identity public key pairs, one or more medium-term signed pre-key pairs, and one or more ephemeral prekey pairs. These keys may be shared with other UEs via the KDC 210 for use in end to end encryption, for example, in communication services such as RCS.

The UE 202 may then send a SIP PUBLISH message including the key bundle 214 to the 3GPP IMS core 206. In turn, the 3GPP IMS core 206 may send the SIP PUBLISH message including the key bundle 216 to the OMA presence server 208. In some examples, the OMA presence server 208 may be a carrier capability exchange application server associated with SIP communication services and RCS in particular and the key bundle may be used to provide end to end encryption for RCS communications.

The OMA presence server 208 may receive the SIP PUBLISH message including the key bundle 216, extract the key bundle and an identifier for the UE 202 (or a user associated therewith) and send, to the KDC 210, a request to store the key bundle 218 in association with the identifier of the UE 202. The SIP PUBLISH message including the key bundle 214 and 216 may not be limited to the key bundle. For example, while not shown, other capabilities may also be included in the SIP PUBLISH messages. In such examples, the information regarding other capabilities may also be stored for the UE 202 by the OMA presence server 208.

The operations illustrated in FIG. 2 may then skip to when the UE 204 may wish to communicate with the UE 202 and may wish to discover the capabilities of the UE 202 and/or the key bundle for end to end encryption specifically.

In particular, the UE 204 may send a SIP SUBSCRIBE message 220 for capability discovery to the 3GPP IMS core 206. The SIP SUBSCRIBE message 220 may include an identifier for the UE 202 and/or other information for the discovery procedure of the carrier network or OMA presence server 208. The 3GPP IMS core 106 may send the SIP SUBSCRIBE message 222 to the OMA presence server 208.

The OMA presence server 208 may extract the identifier of the UE 202 from the SIP SUBSCRIBE message 222. The OMA presence server 208 may send, to the 3GPP IMS core 206, a 200 OK SIP response 224 indicating the SIP SUBSCRIBE message 222 was successfully received, understood and accepted. In turn, the 3GPP IMS core 206 may forward the 200 OK SIP response 226 to the UE 204.

The OMA presence server 208 may then retrieve capability information for UE 202. The retrieval of capability information for UE 202 may include at least sending a get key bundle message 228 to the KDC 210 requesting a key bundle for the identifier of the UE 202. As alluded to above, the retrieval of capability information may include other messages to retrieve other capability information (not shown). If the KDC 210 is storing a key bundle for the UE 202 (e.g., as shown in FIG. 2), the KDC 210 may send a message to the OMA presence server 208 including the key bundle 230. The OMA presence server 208 may gather the retrieved capability information and send, to the 3GPP IMS core 206, a SIP NOTIFY message for returning the key bundle 232 to the UE 204. In turn, the IMS core 206 may forward the SIP NOTIFY message including the key bundle 234 to the UE 204.

The UE 204 may receive the SIP NOTIFY message including the key bundle 234 and extract the key bundle and other capability information. The UE 204 may send, to the 3GPP IMS core 206, a 200 OK SIP response 236 indicating the SIP NOTIFY message 234 was successfully received, understood and accepted. In turn, the 3GPP IMS core 206 may forward the 200 OK SIP response 238 to the OMA presence server 208.

The UE 204 may then initiate communication with the UE 202 using the key bundle to facilitate end to end encryption.

FIG. 3 illustrates an example communication flow 300 for providing asymmetric key exchange for end to end encryption between user equipment utilizing capability upload and discovery messages in a carrier network, according to some implementations. In the illustrated example, the system includes user equipment (UE) 302, UE 304, a 3GPP IMS core 306 of a carrier network, a SIP OPTIONS application server 308 of the carrier network, and a key distribution center (KDC) 310. In the illustrated example, the data flow relates to an implementation of the disclosed systems and methods in a carrier network utilizing a SIP OPTIONS application server. More particularly, the illustrated example of FIG. 3 may utilize the SIP INFO message as a capability upload message and the SIP OPTIONS message as a capability discovery message.

In the operations illustrated in FIG. 3, the UE 302 may generate keys for end to end encryption and then package the keys into a key bundle 312. As discussed above, the key bundle may include one or more long term identity public key pairs, one or more medium-term signed pre-key pairs, and one or more ephemeral prekey pairs. These keys may be shared with other UEs via the KDC 310 for use in end to end encryption, for example, in communication services such as RCS.

The UE 302 may then send a SIP INFO message including the key bundle 314 to the 3GPP IMS core 306. For example, the key bundle may be included in the body of the SIP INFO message in an extended Presence Information Data Format (PIDF). In turn, the 3GPP IMS core 306 may send the SIP INFO message including the key bundle 316 to the SIP OPTIONS application server 308. In some examples, the SIP OPTIONS application server 308 may be a carrier capability exchange application server associated with SIP communication services and RCS in particular and the key bundle may be used to provide end to end encryption for RCS communications.

The SIP OPTIONS application server 308 may receive the SIP INFO message including the key bundle 316, extract the key bundle and an identifier for the UE 302 (or a user associated therewith) and send, to the KDC 310, a request to store the key bundle 318 in association with the identifier of the UE 302. The SIP INFO message including the key bundle 314 and 316 may not be limited to the key bundle. For example, while not shown, other capabilities may also be included in the SIP INFO messages. In such examples, the information regarding other capabilities may also be stored for the UE 302 by the SIP OPTIONS application server 308.

The operations illustrated in FIG. 3 may then skip to when the UE 304 may wish to communicate with the UE 302 and may wish to discover the capabilities of the UE 302 and/or the key bundle for end to end encryption specifically.

In particular, the UE 304 may send a SIP OPTIONS message 320 for capability discovery to the 3GPP IMS core 306. The SIP OPTIONS message 320 may include an identifier for the UE 302 and/or other information for the discovery procedure of the carrier network or SIP OPTIONS application server 308. The 3GPP IMS core 306 may send the SIP OPTIONS message 322 to the SIP OPTIONS application server 308.

The SIP OPTIONS application server 308 may then retrieve capability information for UE 302. For example, the SIP OPTIONS application server 308 may extract the identifier of the UE 302 from the SIP OPTIONS message 322. The retrieval of capability information for UE 302 may include at least sending a get key bundle message 324 to the KDC 310 requesting a key bundle for the identifier of the UE 302. If the KDC 310 is storing a key bundle for the UE 302 (e.g., as shown in FIG. 3), the KDC 310 may send a message to the SIP OPTIONS application server 308 including the key bundle 326.

As alluded to above, the retrieval of capability information may include other messages to retrieve other capability information. As illustrated, the SIP OPTIONS application server 308 may send a SIP OPTIONS message for other capability discovery 328 to the 3GPP IMS core 306. In turn, the 3GPP IMS core 206 may forward the SIP OPTIONS message for other capability discovery 330 to the UE 302. The UE 302 may receive the SIP OPTIONS message for other capability discovery 330 and provide other capability information to the 3GPP IMS core 306 as a 200 OK SIP response 332 with the other capability information included in the body of the 200 OK SIP response. The 3GPP IMS core 306 may forward, to the SIP OPTIONS application server 308, the 200 OK SIP response 334 with the other capability information included in the body of the 200 OK SIP response.

The SIP OPTIONS application server 308 may gather the retrieved capability information from the 200 OK SIP response 334 and the key bundle from the KDC 310. Then, the SIP OPTIONS application server 308 may send, to the 3GPP IMS core 306, a 200 OK SIP response message with the key bundle and the other capability information 336.

In turn, the 3GPP IMS core 306 may forward the 200 OK SIP response message with the key bundle and the other capability information 338 to the UE 304.

The UE 304 may receive the 200 OK SIP response message with the key bundle and the other capability information 338. The UE 304 may then initiate communication with the UE 302 using the key bundle to facilitate end to end encryption.

Figure 4:
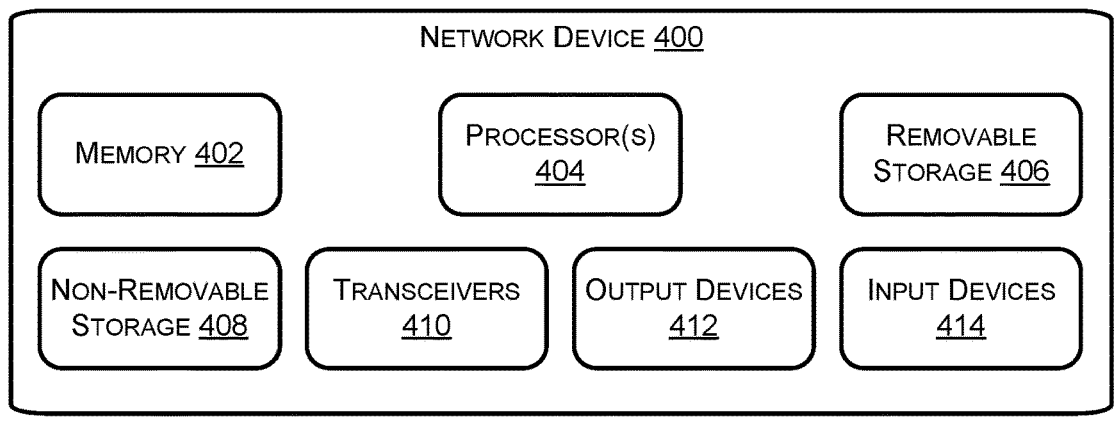
FIG. 4 is a block diagram illustrating relevant high-level components of a device that may be used to implement various of the components described herein.

FIG. 4 illustrates a component level view of a telecommunication network device 400 capable of implementing the IMS core 106, carrier capability exchange application server 108, KDC 110 and other network devices of FIGS. 1-3. The network device 400 may, as an example, comprise a physical or virtual computer server. The network device 400 may comprise a system memory 402 storing various executable components and data for implementing the systems and methods 100-300 of FIGS. 1-3. The network device 400 may further comprise processor(s) 404, a removable storage 406, a non-removable storage 408, transceivers 410, output device(s) 412, and input device(s) 414, any or all of which can be communicatively connected via a communications bus (not shown).

In various examples, the system memory 402 is volatile (such as RAM), non-volatile (such as ROM, flash memory, etc.) or some combination of the two. In some examples, the processor(s) 404 is a central processing unit (CPU), a graphics processing unit (GPU), or both CPU and GPU, or any other sort of processing unit.

The network device 400 also includes additional data storage devices (removable and/or non-removable) such as, for example, magnetic disks, optical disks, or tape. Such additional storage is illustrated in FIG. 4 by removable storage 406 and non-removable storage 408. The system memory 402, removable storage 406 and non-removable storage 408 are all examples of non-transitory computer-readable storage media.

In some examples, the transceivers 410 include any sort of transceivers known in the art. For example, transceivers 410 may include a radio transceiver that performs the function of transmitting and receiving radio frequency communications. Also, or instead, the transceivers 410 may include other wireless or wired connectors, such as Ethernet connectors or near-field antennas. The transceivers 410 may facilitate connectivity between a public network, such as a packet-switched access network (not shown), and one or more other devices of a telecommunication network.

In some examples, the output devices 412 include any sort of output devices known in the art, such as a display, speakers, a vibrating mechanism, or a tactile feedback mechanism. Output devices 412 also include ports for one or more peripheral devices, such as headphones, peripheral speakers, or a peripheral display.

In various examples, the input devices 414 include any sort of input devices known in the art. For example, the input devices 414 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
receiving, by a carrier capability exchange application server of a carrier network and from a first user equipment of the carrier network, a capability upload message, wherein the capability upload message is a Session Initiation Protocol (SIP) message;
determining, by the carrier capability exchange application server, that the capability upload message includes a key bundle for end to end (E2E) encryption of communications from and with the first user equipment, wherein the key bundle includes a long-term identity key pair, a medium-term signed prekey pair, and one or more ephemeral prekey pairs;
in response to the determining the capability upload message includes the key bundle, storing the key bundle in an entry associated with the first user equipment in a key distribution center (KDC);

receiving, by the carrier capability exchange application server and from a second user equipment, a capability discovery message requesting capability information for the first user equipment;

requesting, by the carrier capability exchange application server, the key bundle from the KDC;

receiving, by the carrier capability exchange application server and from the KDC, the key bundle; and transmitting, by the carrier capability exchange application server and to the second user equipment, the key bundle, wherein the key bundle is transmitted in a SIP message.

2. The method of claim 1, wherein the carrier capability exchange application server is one of a SIP OPTIONS application server or an Open Mobile Alliance (OMA) presence server.

3. The method of claim 1, wherein the key bundle of the first user equipment is associated with a Rich Communication Services (RCS) communication service of the carrier network.

4. The method of claim 1, wherein the capability discovery message is one of a SIP OPTIONS message or a SIP SUBSCRIBE message.

5. A system comprising:
one or more computing devices of a carrier network configured to perform operations comprising:
receiving, by a carrier capability exchange application server of a carrier network and from a first user equipment of the carrier network, a capability upload message, wherein the capability upload message is a Session Initiation Protocol (SIP) message;
determining, by the carrier capability exchange application server, that the capability upload message includes a key bundle associated with the first user equipment, wherein the key bundle includes a long-term identity key pair, a medium-term signed prekey pair, and one or more ephemeral prekey pairs; and
in response to the determining the capability upload message includes the key bundle, storing the key bundle in an entry associated with the first user equipment in a key distribution center (KDC).

6. The system of claim 5, wherein the operations further comprise:
receiving, by the carrier capability exchange application server and from a second user equipment, a capability discovery message requesting capability information for the first user equipment;
requesting, by the carrier capability exchange application server, the key bundle from the KDC;
receiving, by the carrier capability exchange application server and from the KDC, the key bundle; and
transmitting, by the carrier capability exchange application server and to the second user equipment, the key bundle, wherein the key bundle is transmitted in a SIP message.

7. The system of claim 6, wherein the capability discovery message is one of a SIP OPTIONS message or a SIP SUBSCRIBE message.

8. The system of claim 5, wherein the key bundle of the first user equipment is associated with a Rich Communication Services (RCS) communication service of the carrier network.

9. The system of claim 5, wherein the carrier capability exchange application server is one of a SIP OPTIONS application server or an Open Mobile Alliance (OMA) presence server.

10. A non-transitory computer-readable media storing computer-executable instructions, which when executed by one or more processors, cause the one or more processors to perform operations comprising:
receiving, by a carrier capability exchange application server of a carrier network, a capability discovery message requesting capability information for a first user equipment, the capability discovery message being received from a second user equipment;
requesting, by the carrier capability exchange application server and from a key distribution center (KDC), a key bundle associated with the first user equipment;
receiving, by the carrier capability exchange application server and from the KDC, the key bundle; and
transmitting, by the carrier capability exchange application server and to the second user equipment, the key bundle, wherein the key bundle is transmitted in a Session Initiation Protocol (SIP) message,
wherein the key bundle includes a long-term identity key pair, a medium-term signed prekey pair, and one or more ephemeral prekey pairs.

11. The non-transitory computer-readable media of claim 10, wherein the operations further comprise:
receiving, by the carrier capability exchange application server and from the first user equipment of the carrier network, a capability upload message, wherein the capability upload message is a SIP message;
determining, by the carrier capability exchange application server, that the capability upload message includes the key bundle associated with the first user equipment; and
in response to the determining the capability upload message includes the key bundle, storing the key bundle in an entry associated with the first user equipment in the KDC.

12. The non-transitory computer-readable media of claim 11, wherein the capability upload message is one of a SIP INFO message or a SIP PUBLISH.

13. The non-transitory computer-readable media of claim 10, wherein message the carrier capability exchange application server is one of a SIP OPTIONS application server or an Open Mobile Alliance (OMA) presence server.

14. The non-transitory computer-readable media of claim 10, wherein the key bundle of the first user equipment is associated with a Rich Communication Services (RCS) communication service of the carrier network.

15. The non-transitory computer-readable media of claim 10, wherein the capability discovery message is one of a SIP OPTIONS message or a SIP SUBSCRIBE message.

16. The method of claim 1, wherein the SIP message is one of a SIP INFO message or a SIP PUBLISH message.

17. The system of claim 5, wherein the SIP message is one of a SIP INFO message or a SIP PUBLISH message.

* * * * *